(12) United States Patent
Slobodin

(10) Patent No.: US 6,334,685 B1
(45) Date of Patent: Jan. 1, 2002

(54) SEGMENTED LIGHT PIPE APPARATUS AND METHOD FOR INCREASING LUMINOUS EFFICIENCY OF SINGLE LIGHT-VALVE, COLOR VIDEO PROJECTION DISPLAYS

(75) Inventor: David E. Slobodin, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/536,177

(22) Filed: Mar. 23, 2000

(51) Int. Cl.[7] ............................................. G03B 21/00
(52) U.S. Cl. ........................................... 353/31; 353/38
(58) Field of Search .............................. 353/31, 33, 34, 353/37, 38, 84; 349/5, 7, 8, 9; 348/742, 743, 771

(56) References Cited

U.S. PATENT DOCUMENTS

| | | | | |
|---|---|---|---|---|
| 5,467,146 A | * | 11/1995 | Huang et al. | 348/743 |
| 5,548,347 A | | 8/1996 | Melnik et al. | 348/61 |
| 5,845,981 A | | 12/1998 | Bradley | 353/31 |
| 5,967,636 A | | 10/1999 | Stark et al. | 353/84 |
| 6,005,722 A | * | 12/1999 | Butterworth et al. | 353/98 |
| 6,257,728 B1 | * | 7/2001 | Bergman et al. | 353/31 |
| 6,266,105 B1 | * | 7/2001 | Gleckman | 348/743 |

* cited by examiner

Primary Examiner—William Dowling
(74) Attorney, Agent, or Firm—Stoel Rives LLP

(57) ABSTRACT

A color sequential video projector (10) employs a color modulating device (22) and a segmented light pipe (30) that coact to provide a high luminous efficiency. The color modulating device splits polychromatic light into three different colored light beams (24, 26, 28) that are positionally stationary, but alternate mutually exclusive colors sequentially with time such that each pixel of a light valve (48) is exposed to all three colors during an image frame time. The segmented light pipe receives the three light beams and forms three adjacent color bands that are precisely aligned on the light valve. Because all three colors of light are constantly illuminating the light valve, light losses are substantially eliminated. The color modulating device employs multiple color wheels (82, 84, 86) each having filter segments (90, 92, 94) that form the three light beams by reflecting the alternating, mutual exclusive colors as the wheels rotate. Alternative embodiments employ one, two, or three color wheels having flat or conically-shaped filter segment surfaces. The segmented light pipe includes three rectangular glass cores (70, 72, 74) surrounded by a low index cladding (78) and having their abutting faces (76) coated with a thin, low refraction index coating. The light pipe input apertures (32, 34, 36) receive three roughly shaped light beams, homogenize them, and provide at three output apertures (38, 40, 42) uniformly bright rectangular light beams. A precision achromatic lens (44) images the uniform light beams onto the light valve such that seams between the beams are imaged to within one micron of accuracy and are parallel to the light valve pixel rows.

20 Claims, 6 Drawing Sheets

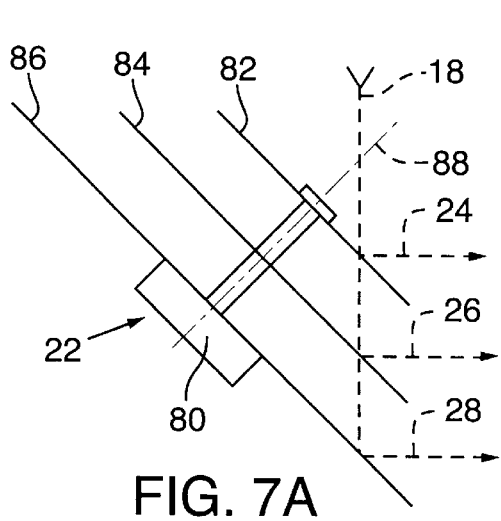
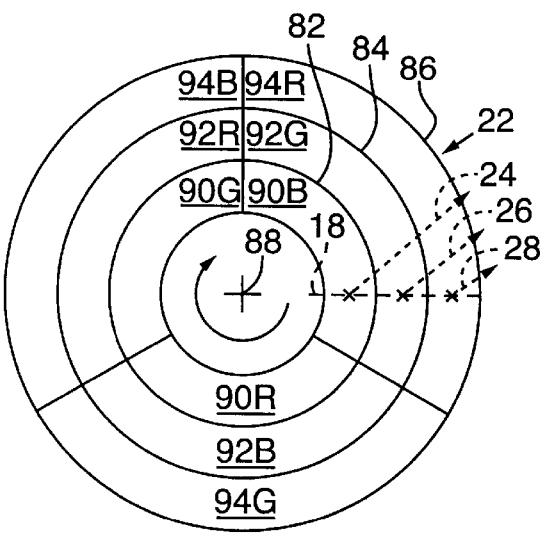
FIG. 7A    FIG. 7B
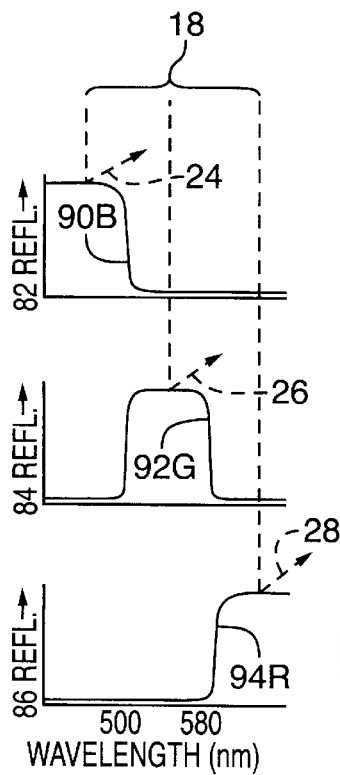
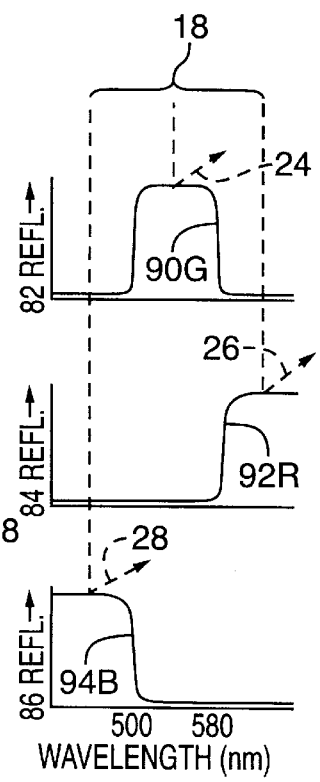
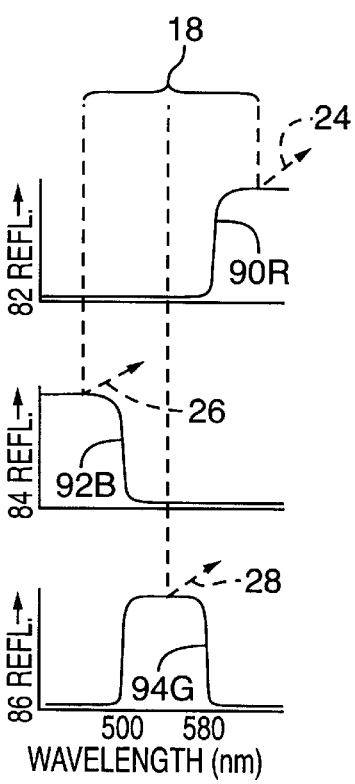
FIG. 8A    FIG. 8B    FIG. 8C

SEGMENTED LIGHT PIPE APPARATUS AND METHOD FOR INCREASING LUMINOUS EFFICIENCY OF SINGLE LIGHT-VALVE, COLOR VIDEO PROJECTION DISPLAYS

RELATED APPLICATIONS

Not Applicable

FEDERALLY SPONSORED RESEARCH OR DEVELOPMENT

Not Applicable

TECHNICAL FIELD

This invention relates to color video projection displays and more particularly to employing multiple color wheels and a segmented light pipe to increase the luminous efficiency of single light valve color video projection displays.

BACKGROUND OF THE INVENTION 1,200 lumens is an accepted brightness goal for color video projectors. A contrary goal is to employ the lowest projection lamp power possible to reduce cooling fan noise and power supply size and cost. Both goals can be achieved by substantially increasing the lumens per watt efficiency (hereafter "luminous efficiency") of the projection display.

A commonly employed way of improving the luminous efficiency of color video projectors is by optically dividing the projection lamp illumination into three separate pathways, one for each primary color, providing a light valve in each pathway, modulating each light valve with its respective color data, and recombining the three pathways into a converged projected color image. Such three-path color video projectors have suitable luminous efficiency, but are generally costly, large, heavy, optically complex, and require precision alignment.

Prior workers have addressed the above-described problems by employing frame sequential illumination through a single light path that color timeshares a single light valve. Current single light valve projectors are relatively inexpensive, light weight, and compact. Such projectors provide color sequential illumination of the light valve by typically employing a color wheel which, unfortunately, transmits only about 30 percent of the projection lamp illumination at any time. Such projectors typically employ about a 120 watt projection lamp, which results in a brightness of only about 600–800 lumens.

U.S. Pat. No. 5,548,347 for SINGLE PANEL COLOR PROJECTION VIDEO DISPLAY HAVING IMPROVED SCANNING, and U.S. Pat. No. 5,845,981 for MULTI-COLOR-BAND SCROLLING ACROSS SINGLE-PANEL LIGHT VALVE describe systems for increasing the luminous efficiency of single path color video projectors by dividing the projection lamp illumination into three primary colors and passing the primary colors through rotating prisms to scroll the resulting color bands across a single light valve. Color data driving the light valve is scrolled in synchronism with the prism rotation to project a color image. Unfortunately, such projectors are are relatively costly, heavy, and optically complex. Moreover, color purity depends on scrolling the color bands across the light valve in precise synchronism with the prism rotation. Accordingly, color purity is ensured by optically separating the scrolling color bands with dark "guard bands" which, unfortunately, reduces the luminous efficiency.

SUMMARY OF THE INVENTION

An object of this invention is, therefore, to provide an apparatus and a method for increasing the luminous efficiency of a single-path color video projector.

Another object of this invention is to provide a segmented light pipe for enabling three-color area-division multiplexing of a single light valve.

A further object of this invention is to provide multiple color wheel embodiments for illuminating the light pipe segments with alternating primary colors.

Still another object of this invention is to provide a color video projector that projects a 1,200 lumen image with a 120 watt projection lamp.

A color sequential video projector of this invention employs a color modulating device and a segmented light pipe that coact to at least double the lumens per watt efficiency of the projector relative to projectors employing conventional color wheels. This invention employs a color modulating device that splits polychromatic light into three different colored light beams that are positionally stationary, but alternate mutually exclusive colors sequentially with time such that each pixel of a light valve is exposed to all three colors over an image frame time. A segmented light pipe receives the three light beams and forms three adjacent color bands that are precisely aligned on the light valve. Because all three colors of light are constantly illuminating the light valve, albeit in a rapidly alternating manner, the approximately 60 percent color wheel light attenuation is substantially eliminated.

The color modulating device employs multiple color wheels each having filter segments that form the three light beams by reflecting the alternating, mutual exclusive colors as the wheels rotate. Alternative embodiments employ one, two, or three color wheels having flat or conically-shaped filter segment surfaces.

The segmented light pipe includes three rectangular glass slabs surrounded by a low index cladding and having their abutting surfaces coated with a very thin, low refraction index coating. The light pipe input apertures receive three roughly shaped light beams, homogenize them, and provide at three output apertures uniformly bright rectangular light beams. A precision achromatic lens images the uniform light beams onto the light valve such that seams between the beams are imaged to within one micron of accuracy and are parallel to the light valve pixel rows.

Additional objects and advantages of this invention will be apparent from the following detailed description of preferred embodiments thereof that proceed with reference to the accompanying drawings.

BRIEF DESCRIPTION OF THE DRAWINGS

FIGS. 7A and 7B are respective side and plan pictorial views of a three color wheel embodiment of a color modulating device of this invention.

FIGS. 8A, 8B, and 8C graphically represent reflectance versus wavelength response characteristics for color wheel filter segments of this invention.

DETAILED DESCRIPTION OF PREFERRED EMBODIMENTS

Figure 1:
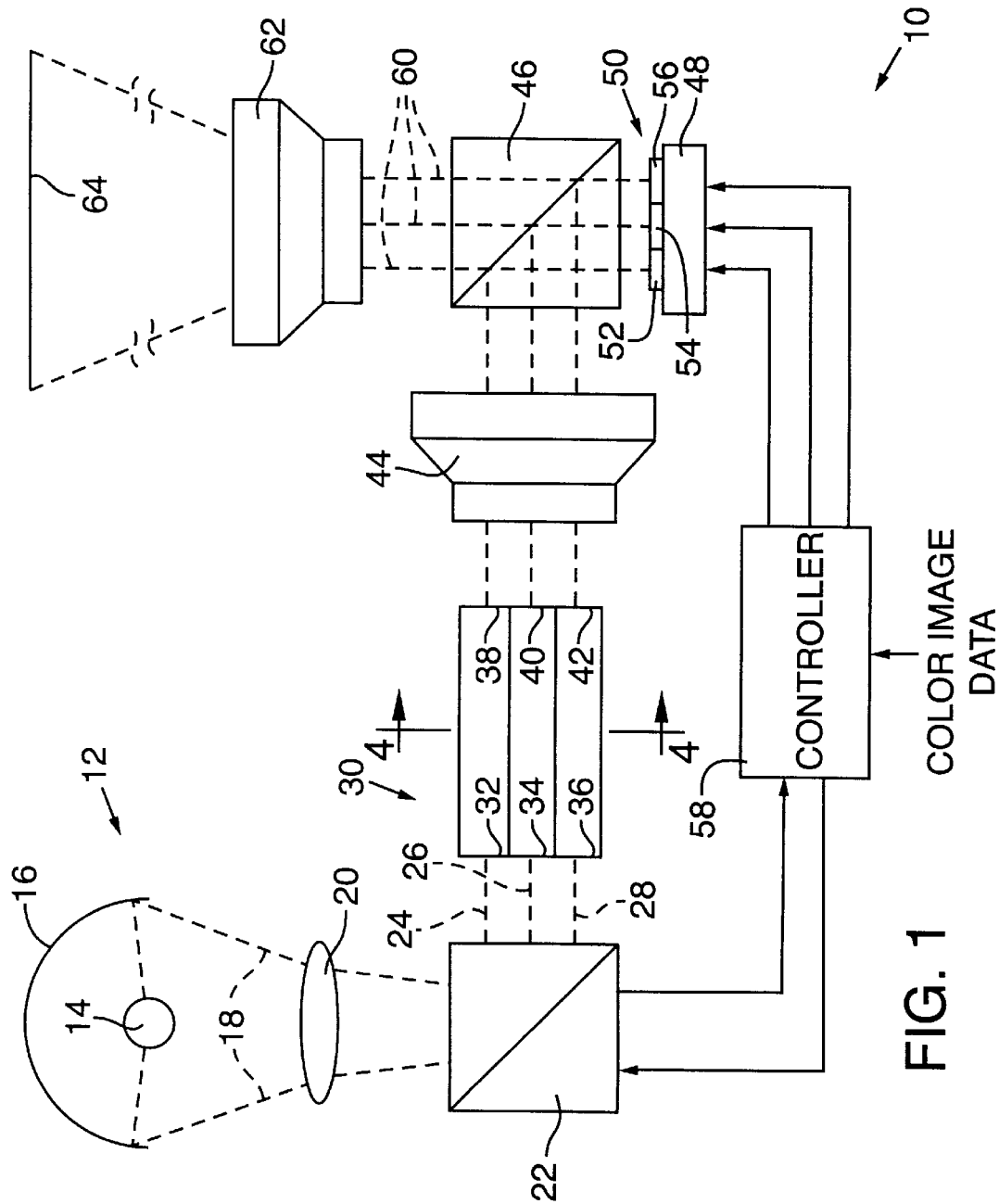
FIG. 1 is a simplified overall schematic block diagram showing a color video projector of this invention.

FIG. 1 shows a single light valve color video projector 10 of this invention that achieves a high luminous efficiency by reducing illumination losses associated with color modulating devices, such as a color wheel. Projector 10 provides a projected polychromatic image having a brightness of at least about 1,200 lumens.

Projector 10 includes a light source 12 having a lamp 14 and a reflector 16 that produce intense polychromatic light 18 that is focused by a relay lens 20 on a color modulating device 22, embodiments of which are described with reference to FIGS. 7–12. Lamp 14 is preferably a metal halide arc lamp or high-intensity discharge lamp having a power dissipation of about 120 watts.

Color modulating device 22 receives polychromatic light 18 and divides it into first, second, and third light beams 24, 26, and 28 each comprising alternating and mutually exclusive first, second, and third colors, preferably red ("R"), green ("G"), and blue ("B"). First, second, and third light beams 24, 26, and 28 are directed to a segmented light pipe 30 having first, second, and third input apertures 32, 34, and 36 that are positioned to receive respective first, second, and third light beams 24, 26, and 28.

Figure 2A:
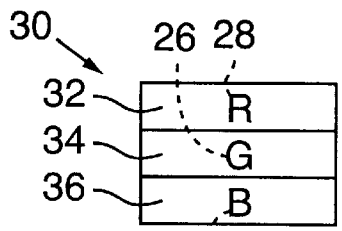
FIGS. 2A, 2B, and 2C are simplified plan views of horizontally arranged aperture segments of a light pipe propagating a color illumination sequence of this invention.
Figure 2B:
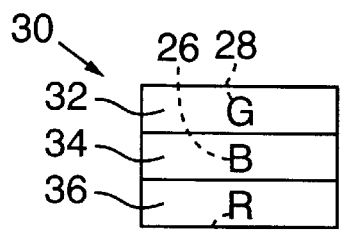
Figure 2C:
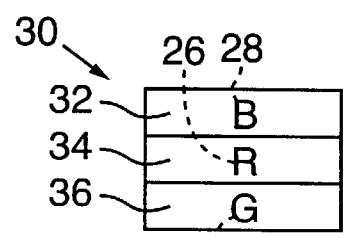

FIGS. 2A, 2B, and 2C show a first arrangement of first, second, and third input apertures 32, 34, and 36. FIGS. 2A, 2B, and 2C show the colors of light generated by color modulating device 22 and propagated by first, second, and third light beams 24, 26, and 28 during respective first, second, and third sequential time periods. First input aperture 32 is sequentially illuminated by R, G, and B light while second input aperture 34 is illuminated by G, B, and R light and third input aperture 36 is illuminated by B, R, and G light. Accordingly, segmented light pipe 30 is illuminated by all three light colors during all three time periods, but the colors illuminating first, second, and third input apertures 32, 34, and 36 are mutually exclusive during the three time periods. Color modulating device 22 continually repeats the color sequence shown in FIGS. 2A, 2B, and 2C at a rate above a human viewer's flicker fusion frequency.

Figure 3A:
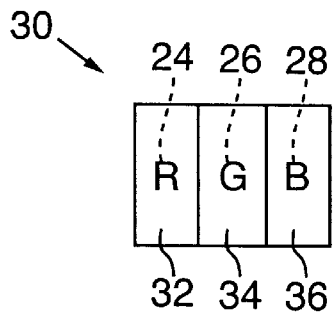
FIGS. 3A, 3B, and 3C are simplified plan views of preferred vertically arranged aperture segments of a light pipe showing a color illumination sequence of this invention.
Figure 3B:
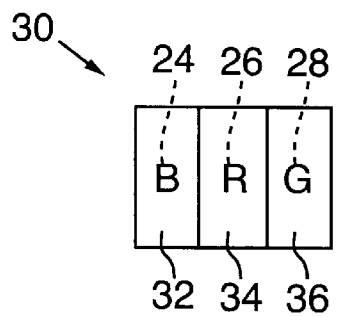
Figure 3C:
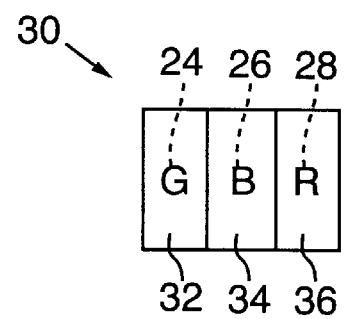

FIGS. 3A, 3B, and 3C show a second arrangement of first, second, and third input apertures 32, 34, and 36. The second arrangement is preferred because it provides first, second, and third input apertures 32, 34, and 36 with a more favorable illumination aspect ratio. As before, FIGS. 3A, 3B, and 3C show the colors of light generated by color modulating device 22 and propagated by first, second, and third light beams 24, 26, and 28 during respective first, second, and third sequential time periods. However, in this embodiment, first input aperture 32 is sequentially illuminated by R, G, and B light while second input aperture 34 is illuminated by G, R, and B light and third input aperture 36 is illuminated by B, G, and R light. Again, segmented light pipe 30 is illuminated by all three light colors during all three time periods, but the colors illuminating first, second, and third input apertures 32, 34, and 36 are mutually exclusive during the three time periods. Of course, other mutually exclusive color sequences may alternatively be employed.

Referring again to FIG. 1, segmented light pipe 30 homogenizes first, second, and third light beams 24, 26, and 28 and propagates them out respective first, second, and third output apertures 38, 40, and 42. Embodiments of segmented light pipe 30 are described with reference to FIGS. 4–6.

An achromatic lens 44 projects images of first, second, and third output apertures 38, 40, and 42 through an optional prism 46 onto a light valve 48. Light valve 48 has a contiguous addressable area 50 that is sub-addressable as first, second, and third addressable segments 52, 54, and 56 for receiving the images of first, second, and third output apertures 38, 40, and 42 that are brightly illuminated by first, second, and third light beams 24, 26, and 28. Light valve 48 is preferably a DMD or reflective CMOS device. Achromatic lens 44 preferably has six or seven elements of sufficient optical quality to project the images of first, second, and third output apertures 38, 40, and 42 accurately onto respective first, second, and third addressable segments 52, 54, and 56 without overlapping or separation that would cause a visible seam in the projected image. Preferably the optical accuracy should allow adjacent rows or columns of pixels in light valve 48 to lie on either side of the seam. In this regard, FIGS. 2A through 3C could also represent the images of output apertures 38, 40, and 42 as they are projected on addressable area 50 of light valve 48.

A controller 58 coupled to color modulating device 22 determines when the first, second, and third sequential time periods occur and conveys color video data to first, second, and third addressable segments 52, 54, and 56 in synchronous correspondence with the sequentially alternating and mutually exclusive first, second, and third colors propagated by color modulating device 22 such that light valve 48 reflects or propagates polychromatic image forming light rays 60 through prism 46 and a projection lens 62 to a projection screen 64. The polychromatic image on projection screen 64 preferably has a brightness of at least about 1,200 lumens.

Figure 4:
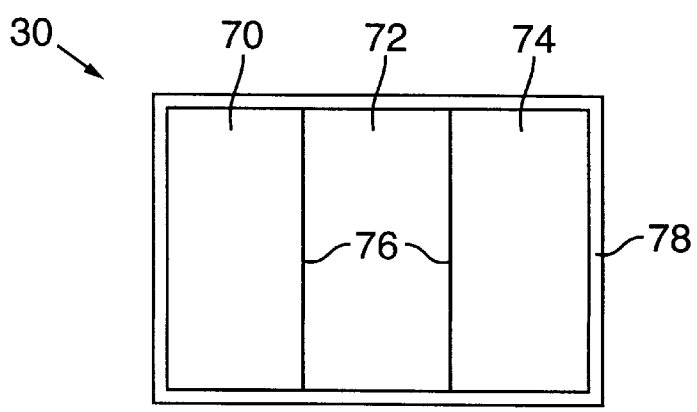
FIG. 4 is a cross-sectional view of a segmented light pipe of this invention taken across lines 4—4 of FIG. 1.

FIG. 4 shows a cross-sectional view of segmented light pipe 30, which includes first, second, and third rectangular, optically conductive cores 70, 72, and 74 that are coated on their abutting faces 76 with a very thin (e.g., 500 Angstroms) metal, preferably aluminum and held together by a low index cladding 78. Segmented light pipe 30 may alternatively be held together by employing optical flat adhesion.

Figure 5:
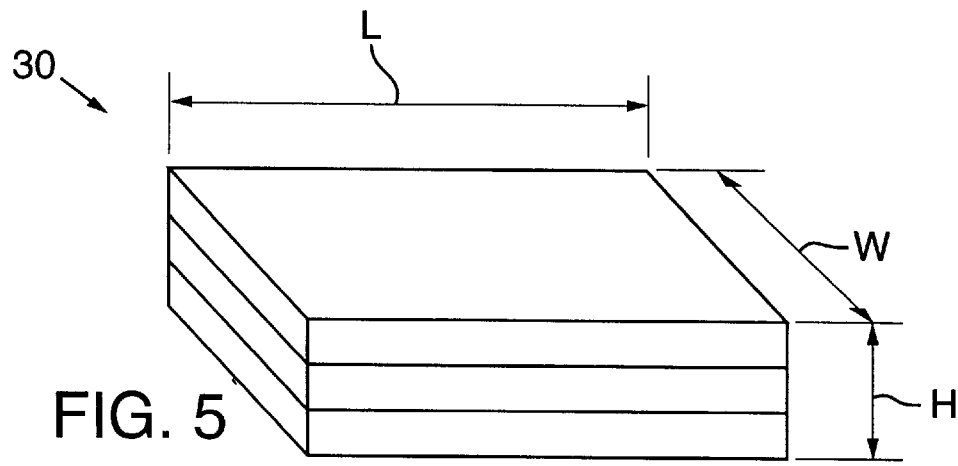
FIG. 5 is a simplified oblique pictorial view of a segmented light pipe of this invention.

FIG. 5 shows a first embodiment of segmented light pipe 30 in which cores 70, 72, and 74 are preferably formed from optical glass, have a length L of at least 2.0 centimeters, a height H of about 0.1 centimeter, and a width W of about 0.6 centimeter.

Figure 6:
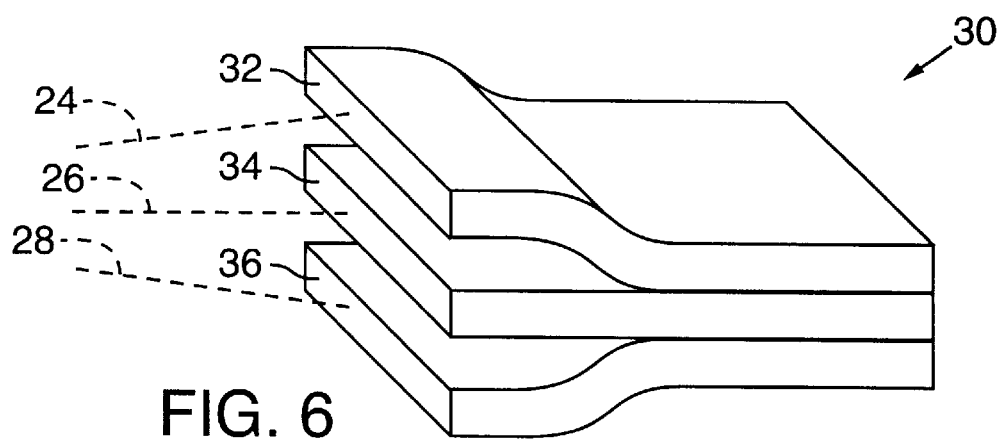
FIG. 6 is a simplified oblique pictorial view of a segmented light pipe having flared input apertures of this invention.

FIG. 6 shows an alternative embodiment of segmented light pipe 30, which has the same cross-sectional construction as the first embodiment, but in which first, second, and third input apertures 32, 34, and 36 are flared apart to receive respective first, second, and third light beams 24, 26, and 28 with a minimum of adjacent beam overlap.

Other alternative embodiments (not shown) of segmented light pipe 30 may include sizes, shapes, contours, and angles of first, second, and third input apertures 32, 34, and 36 that are optimized to receive a variety of possible cross-sectional shapes and reception angles of first, second, and third light beams 24, 26, and 28.

FIGS. 7A and 7B show a first embodiment of color modulating device 22 in which a motor 80 co-rotates first, second, and third color wheels 82, 84, and 86 about a rotational axis 88.

First color wheel 82 includes 120-degree dichroic filter segments 90B, 90G, and 90R that sequentially receive polychromatic light 18 from light source 12 and form first light beam 24 by reflecting respective ones of first, second, and third colors, e.g., B, G, and R, while transmitting the other two colors to second color wheel 84.

Second color wheel 84 includes 120-degree dichroic filter segments 92G, 92R, and 92B that are aligned with filter segments 90 to receive the other two colors and form second light beam 26 by reflecting ones of the other two colors, e.g., G, R, and B, while transmitting remaining colors.

Third color wheel 86 includes 120-degree dichroic filter segments 94R, 94B, and 94G that are aligned with filter segments 90 and 92 to receive the remaining colors and form third light beam 28 by reflecting selected ones of the remaining colors, e.g., R, B, and G.

FIGS. 8A, 8B, and 8C show a representative set of reflectance versus wavelength response characteristics for the dichroic color wheel filter segments of this invention. FIGS. 8A, 8B, and 8C show filter segment responses occurring when first, second, and third color wheels 82, 84, and 86 are rotationally aligned to receive polychromatic light 18 during the respective first, second, and third sequential time periods.

In particular, FIG. 8A shows that during the first time period, filter segment 90B receives polychromatic light 18, reflects B light as first light beam 24, transmits G and R light to second and third color wheels 92 and 94, second color wheel filter segment 92G reflects the G light as second light beam 26, and third color wheel filter segment 94R reflects the R light as third light beam 28.

FIG. 8B shows that during the second time period, filter segment 90G receives polychromatic light 18, reflects G light as first light beam 24, transmits B and R light to second and third color wheels 92 and 94, second color wheel filter segment 92R reflects the R light as second light beam 26, and third color wheel filter segment 94B reflects the B light as third light beam 28.

FIG. 8C shows that during the third time period, filter segment 90R receives polychromatic light 18, reflects R light as first light beam 24, transmits B and G light to second and third color wheels 92 and 94, second color wheel filter segment 92B reflects the B light as second light beam 26, and third color wheel filter segment 94G reflects the G light as third light beam 28.

Figure 9A:
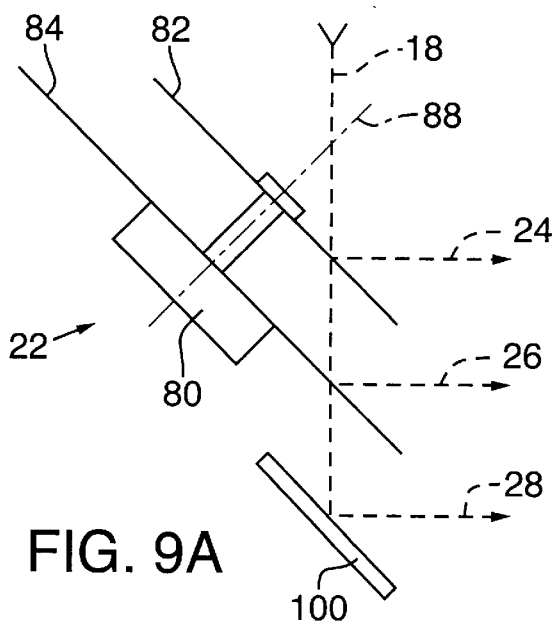
FIGS. 9A and 9B are respective side and plan pictorial views of a two color wheel embodiment of a color modulating device of this invention.
Figure 9B:
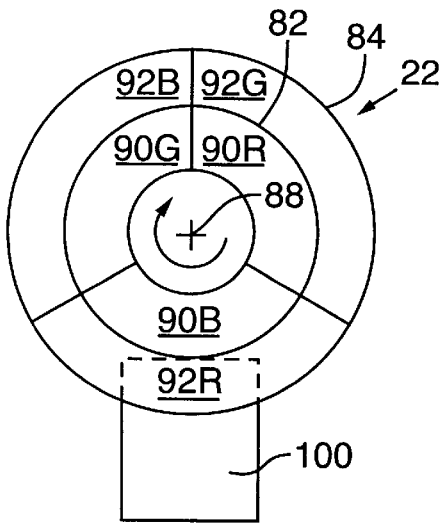

FIGS. 9A and 9B show a preferred second embodiment of color modulating device 22 in which motor 80 co-rotates only first and second color wheels 82 and 84 about rotational axis 88, and third color wheel 86 is replaced by a mirror 100. In this embodiment, the filter segment ordering is on each color wheel is changed merely by way of example. Alternatively, the ordering employed in the first embodiment, or other orderings, could be employed.

First color wheel 82 includes 120-degree dichroic filter segments 90R, 90G, and 90B that sequentially receive polychromatic light 18 from light source 12 and form first light beam 24 by reflecting respective ones of first, second, and third colors, e.g., R, G, and B, while transmitting the other two colors to second color wheel 84.

Second color wheel 84 includes 120-degree dichroic filter segments 92G, 92B, and 92R that are aligned with filter segments 90 to receive the other two colors and form second light beam 26 by reflecting ones of the other two colors, e.g., G, B, and R, while transmitting the remaining colors. If filter segments 90 and 92 have well defined color separation, the remaining colors transmitted will be substantially B, R, and G, and no additional dichroic filtering will be necessary.

Accordingly, third color wheel 86 may be replaced by mirror 100, which forms third light beam 28 by reflecting the remaining colors, e.g., B, R, and G.

Figure 10A:
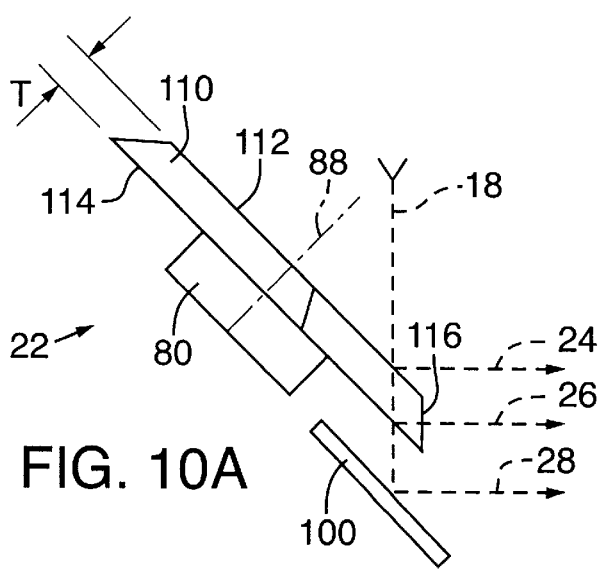
FIGS. 10A and 10B are respective side and plan pictorial views of a single color wheel embodiment of a color modulating device of this invention.
Figure 10B:
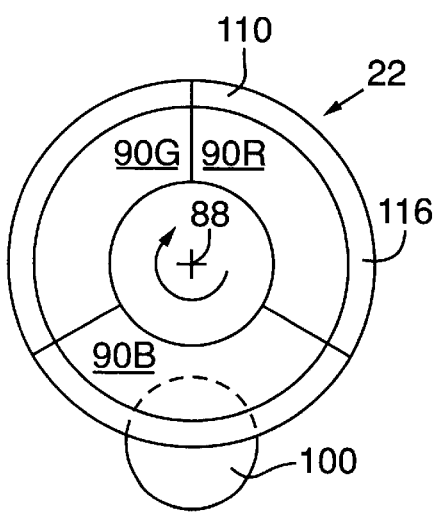

FIGS. 10A and 10B show a third embodiment of color modulating device 22 in which motor 80 rotates a single color wheel 110 about rotational axis 88. In this embodiment, color wheel 110 is formed from a disk of optically transparent material having a thickness T that separates first and second major surfaces 112 and 114. Filter segments 90R, 90G, and 90B are formed on first surface 112 and filter segments 92G, 92B, and 92R (not shown) are formed on corresponding portions of surface 114. Mirror 100 is in the same relative position as shown in the second embodiment. Color wheel 110 further includes a peripheral surface 116 that is beveled to facilitate exiting propagation of second light beam 26.

Figure 11A:
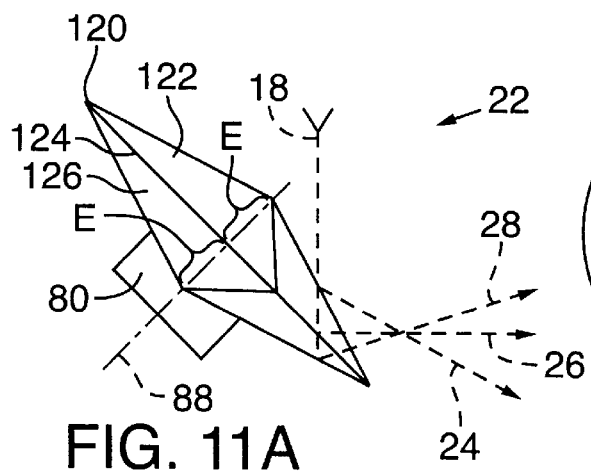
FIGS. 11A and 11B are respective side and plan pictorial views of a double conical-shaped color wheel embodiment of a color modulating device of this invention.
Figure 11B:
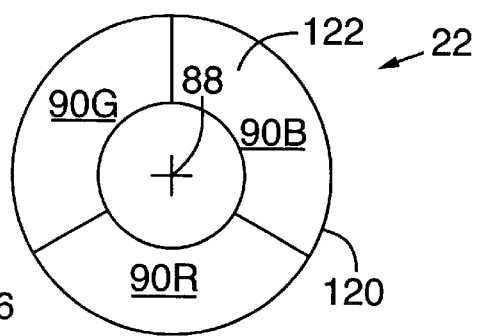

FIGS. 11A and 11B show a fourth embodiment of color modulating device 22 in which motor 80 rotates a double-conically-shaped color wheel 120 about rotational axis 88. In this embodiment, color wheel 120 is formed from two cones of optically transparent material each having an elevation E for forming a tapering separation between first, second, and third major surfaces 122, 124, and 126. Major surface 124 is preferably the flat surface opposite conical surface 122. Filter segments 90B, 90G, and 90R are formed on first surface 122, filter segments 92B, 92G, and 92R (not shown) are formed on corresponding portions of second surface 124, and filter segments 94B, 94G, and 94R (not shown) are formed on corresponding portions of third surface 126. Alternatively, third surface 126 may include a mirror surface.

In this embodiment, filtered colors of polychromatic light 18 are reflected from first surface 122 at an obtuse angle, from second surface 124 at a right angle, and from third surface 126 at an acute angle, causing first, second, and third light beams 24, 26, and 28 to converge and then diverge. This arrangement provides good color isolation by positioning segmented light pipe 30 (FIG. 6) such that input apertures 32, 34, and 36 intersect first, second, and third light beams 24, 26, and 28 at points of substantial divergence.

Figure 12A:
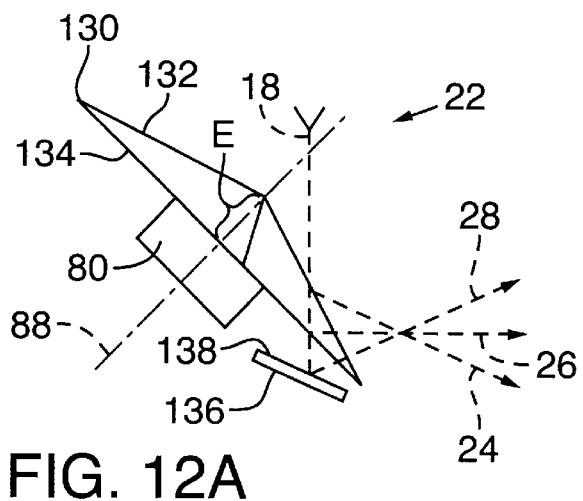
FIGS. 12A and 12B are respective side and plan pictorial views of a single conical-shaped color wheel embodiment of a color modulating device of this invention.
Figure 12B:
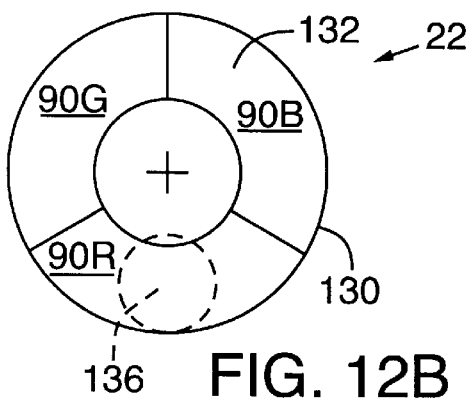

FIGS. 12A and 12B show a fifth embodiment of color modulating device 22 in which motor 80 rotates a single-conically-shaped color wheel 130 about rotational axis 88. In this embodiment, color wheel 130 is formed a single cone of optically transparent material having an elevation E for forming a tapering separation between first and second major surfaces 132 and 134. Filter segments 90B, 90G, and 90R are formed on first surface 132, filter segments 92B, 92G, and 92R (not shown) are formed on corresponding portions of second surface 134, and a mirror 136 forms a third surface 138.

In this embodiment, filtered colors of polychromatic light 18 are reflected from first surface 132 at an obtuse angle, from second surface 134 at a right angle, and from third surface 138 at an acute angle, causing first, second, and third light beams 24, 26, and 28 to converge and then diverge. As described with reference to FIG. 11, this arrangement also provides good color isolation.

There are performance tradeoffs between the flat color wheel embodiments of FIGS. 7–10 and the conical color wheel embodiments of FIGS. 11 and 12.

The flat color wheel embodiments of FIGS. 7–10 have less light attenuation because light is transmitted only once through the dichroic filter segments.

The conical color wheel embodiments of FIGS. 11 and 12 have greater light attenuation because light is transmitted twice through the dichroic filter segments.

Polychromatic light 18 is subject to beam spreading so needs to be focused by relay lens 20 to a spot on the color wheels to reduce light loss and color purity problems when transitioning between filter segments. Beam spreading effects may be minimized by equalizing path length differences between relay lens 20 and input apertures 32, 34, and 36. In this regard, the conical color wheel embodiments of FIGS. 11 and 12 are preferred.

Referring again to FIG. 1, controller 58 is coupled to color modulating device 22 in part to determine when the first, second, and third sequential time periods occur relative to the rotation of the filter segments. Determining precisely when the first, second, and third colors are propagated by color modulating device 22 may be sensed by conventional rotary encoder methods or preferably by sensing color changes as described in allowed U.S. Pat. No. 5,967,636 for COLOR WHEEL SYNCHRONIZATION APPARATUS AND METHOD, which is assigned to the assignee of this application.

It will be obvious to those having skill in the art that many changes may be made to the details of the above-described embodiments of this invention without departing from the underlying principles thereof. Accordingly, it will be appreciated that this invention is also applicable to display applications other than those found in color video projectors. The scope of this invention should, therefore, be determined only by the following claims.

I claim:

1. A color video projector apparatus having high luminous efficiency, comprising:
    a light source producing polychromatic light and having a predetermined power dissipation;
    a color modulating device receiving the polychromatic light and separating it into first, second, and third light beams comprising alternating and mutually exclusive first, second, and third colors;
    a light pipe having first, second, and third input apertures positioned to receive the respective first, second, and third light beams, the light pipe homogenizing the first, second, and third light beams and propagating them from respective first, second, and third output apertures;
    a light valve having an addressable area that is sub-addressable as first, second, and third addressable segments that respectively receive from the light pipe the first, second, and third light beams;
    a controller conveying to the first, second, and third addressable segments colored video data corresponding with the sequentially alternating and mutually exclusive first, second, and third colors propagated by the color modulating device such that the light valve propagates a polychromatic image; and
    a projection lens focusing the polychromatic image on a projection screen with a predetermined luminance.

2. The apparatus of claim 1 in which the first second and third colors are red, green, and blue.

3. The apparatus of claim 1 in which the light source includes an arc lamp and a reflector.

4. The apparatus of claim 1 in which the predetermined power dissipation is less than about 120 watts, and the predetermined luminance is greater than about 1,200 lumens.

5. The apparatus of claim 1 in which the light valve includes a DMD or a reflective CMOS device.

6. The apparatus of claim 1 in which the color modulating device further comprises:
    a first set of moving filter segments that sequentially receive the polychromatic light and form the first light beam by reflecting respective ones of the first, second, and third colors while transmitting the other two colors;
    a second set of filter segments moving in synchronism with the first set of moving filter segments to receive the other two colors and form the second light beam by reflecting respective ones of the other two colors while transmitting a remaining color; and
    an optical device that receives the remaining color and forms the third light beam by reflecting the remaining color.

7. The apparatus of claim 6 in which the first and second sets of filter segments are rotated by at least one color wheel.

8. The apparatus of claim 6 in which the optical device is a mirror.

9. The apparatus of claim 1 further including a relay lens that focuses the polychromatic light on the color modulating device.

10. The apparatus of claim 1 in which the first, second, and third addressable segments of the light valve are adjacent rectangular areas having seams between them and the apparatus further includes an achromatic lens positioned between the light pipe output apertures and the light valve to precisely focus the first, second, and third light beams on the respective first, second, and third addressable segments such that the seams are not visible in the projected polychromatic image.

11. The apparatus of claim 1 in which the first, second, and third input apertures of the light pipe are flared apart to receive the respective first, second, and third light beams.

12. The apparatus of claim 1 in which the segmented light pipe further includes three cross-sectionally rectangular, optically transparent cores having abutting surfaces that are coated with reflective film.

13. A method of projecting polychromatic video images with a high luminous efficiency, comprising: producing polychromatic light with a light source having a predetermined power dissipation;
    separating the polychromatic light into first, second, and third light beams comprising alternating and mutually exclusive first, second, and third colors;
    homogenizing the first, second, and third light beams;
    imaging the homogenized first, second, and third light beams onto first, second, and third addressable segments of a light valve;
    conveying to the first, second, and third addressable segments colored video data corresponding with the sequentially alternating and mutually exclusive first, second, and third colors such that the light valve propagates a polychromatic image; and
    projecting the polychromatic image on a projection screen with a predetermined luminance.

14. The method of claim 13 in which the first second and third colors are red, green, and blue.

15. The method of claim 13 in which the predetermined power dissipation is less than about 120 watts, and the predetermined luminance is greater than about 1,200 lumens.

16. The method of claim 13 in which the light valve includes a DMD or a reflective CMOS device.

17. The method of claim 13 in which separating the polychromatic light further comprises:

moving a first set of filter segments to sequentially receive the polychromatic light and form the first light beam by reflecting respective ones of the first, second, and third colors while transmitting the other two colors;

moving a second set of filter segments in synchronism with the first set of moving filter segments to receive the other two colors and form the second light beam by reflecting respective ones of the other two colors while transmitting a remaining color; and reflecting the remaining color to form the third light beam.

18. The method of claim 17 in which the first and second sets of filter segments moved by rotating at least one color wheel.

19. The method of claim 17 in which the reflecting is carried out by a mirror.

20. The method of claim 13 in which the homogenizing and imaging of the first, second, and third light beams further comprise providing a segmented light pipe having first, second, and third input apertures positioned to receive the respective first, second, and third light beams, and having respective first, second, and third cross-sectionally rectangular output apertures positioned for projecting the homogenized first, second, and third light beams onto the respective first, second, and third addressable segments of the light valve.

* * * * *